United States Patent [19]

Shinada

[11] 4,447,983

[45] May 15, 1984

[54] PLANT IRRIGATION SYSTEM

[76] Inventor: Junji Shinada, 20 N. Ellesmere Ave., Burnaby, B. C., Canada, V5B 1J8

[21] Appl. No.: 455,204

[22] Filed: Jan. 3, 1983

[51] Int. Cl.³ ............................................. A01G 29/00
[52] U.S. Cl. ......................................... 47/48.5; 47/79
[58] Field of Search ..................... 47/48.5, 79, 80, 59, 47/60, 61, 62, 63, 64, 65

[56] References Cited

U.S. PATENT DOCUMENTS

| | | | |
|---|---|---|---|
| 2,241,699 | 5/1941 | Cooper | 47/59 |
| 2,865,457 | 12/1958 | Jensen | 137/409 |
| 4,057,933 | 11/1977 | Enyeart | 47/79 |
| 4,270,309 | 6/1981 | Baumann | 47/79 |

Primary Examiner—Robert A. Hafer
Assistant Examiner—Bradley M. Lewis
Attorney, Agent, or Firm—Carver & Co.

[57] ABSTRACT

An apparatus for irrigating plants includes a planter having a container for a growing medium. A liquid reservoir is below the container. There are openings between the reservoir and the container, permitting a flow of liquid from the reservoir to the container. A filler conduit communicates with the reservoir. A float chamber is near the top of the reservoir. A float chamber conduit extends from the reservoir to the float chamber. There is a float in the float chamber and a normally closed air valve is operatively connected to the float so the float opens the valve when liquid from the reservoir rises in the float chamber. There may be an air conduit connected to the valve so pressurized air from the air conduit is discharged when the valve opens. There may be a closed liquid container normally positioned below the planter. A liquid conduit communicates with the insides of the container near the bottom thereof and is connected to the filler conduit. There may also be an air pump for pressurizing the liquid container.

11 Claims, 1 Drawing Figure

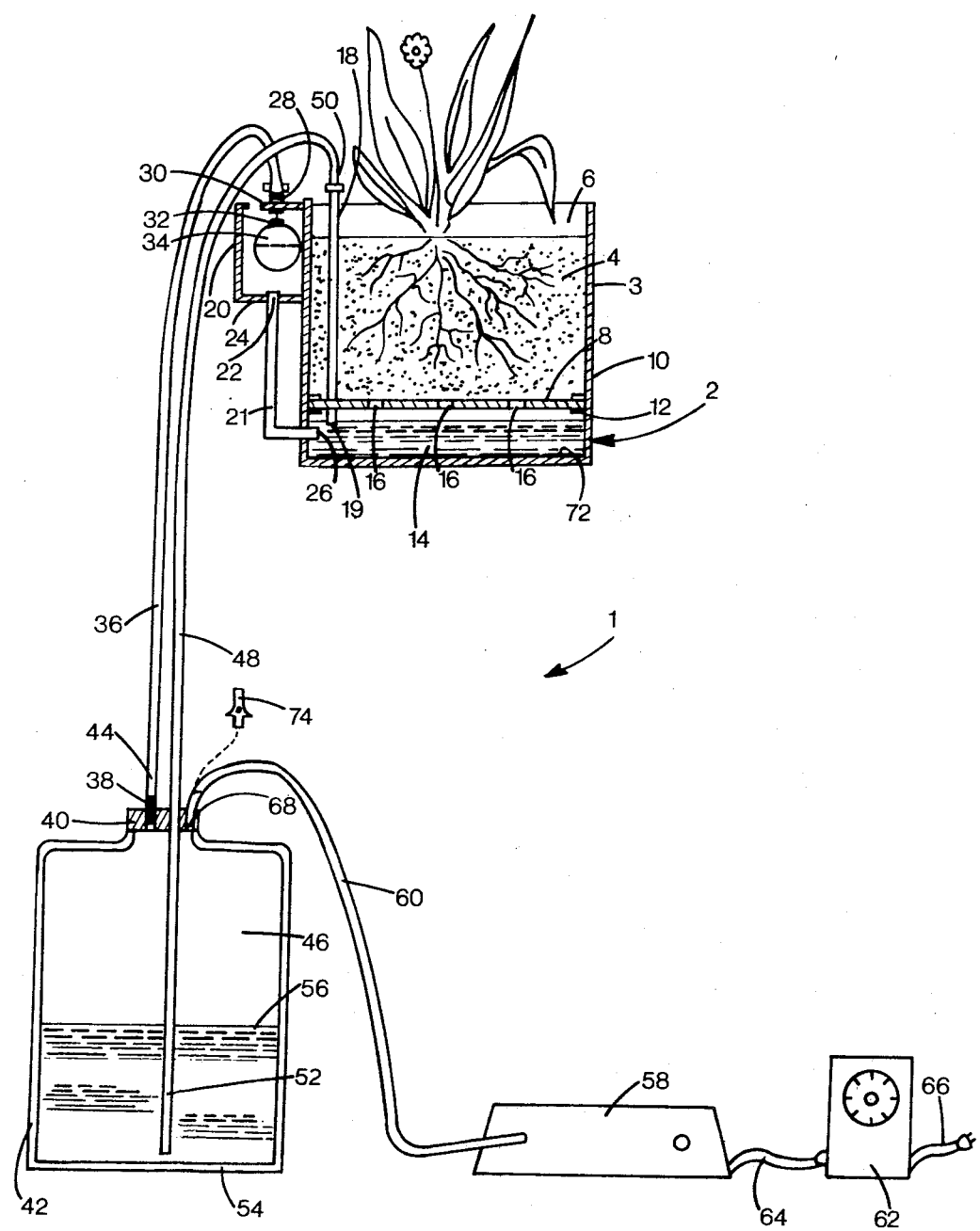

PLANT IRRIGATION SYSTEM

BACKGROUND OF THE INVENTION

The invention relates to an apparatus for irrigating plants, particularly for hydroponics and hanging plants and for propagating plants.

Earlier devices for watering hanging plants or for hydroponic irrigation have been developed. For example, U.S. Pat. No. 2,983,076 to Merrill shows a watering device for houseplant containers that utilizes a hand pump mechanism. A bulb is used to pump air into a liquid-containing chamber. This forces liquid into the bottom of a tube for flow upwardly into gravel.

U.S. Pat. No. 1,815,676 to Medveczky discloses a flower pot with inner and outer containers. The outer container is filled with water.

U.S. Pat. No. 1,383,368 to Ambrose discloses a flower pot that includes a filling tube 18 which allows watering a plant from the top.

U.S. Pat. No. 1,251,125 to Smith shows a flower pot with inner and outer casings and a tube that allows moisture to pass from a compartment into an inner casing.

U.S. Pat. No. 4,057,933 to Enyeart shows an indoor plant container and apparatus which includes a check valve to prevent a reverse flow of water.

U.S. Pat. No. 4,300,311 to Marchant discloses a hydroponic irrigation valve and system. There is a control valve with an inlet port that allows liquid to pass into or from the container.

In addition, hanging plant waterers are known which comprise a flexible container and a rigid, cane-shaped tube. The bottom of the tube extends through the top of the container to the bottom of the container. Water is forced up the tube to the downwardly curved upper end to water the plant when the container is squeezed.

Despite these earlier devices, there is still a need for an improved system for watering hanging plants and hydroponic irrigation.

SUMMARY OF THE INVENTION

The invention provides an apparatus for irrigating plants. The apparatus comprises a planter with a container for a growing medium and a liquid reservoir below the container. There are openings between the reservoir and the container, permitting a flow of liquid from the reservoir to the container. A filler conduit communicates with the reservoir. There is a float chamber near the top of the container and a float chamber conduit extending from the reservoir to the float chamber. There is a float in the float chamber and a normally closed air valve operatively connected to the float so the float opens the valve when liquid from the reservoir rises in the float chamber.

There may be an air conduit connected to the valve, so pressurized air from the air conduit is discharged when the valve opens.

Preferably there is a closed liquid container normally positioned below the planter. The liquid container has a top, a bottom, and means for connecting the air conduit to the container so an end of the air conduit opposite the air valve communicates with the inside of the liquid container near the top thereof. A liquid conduit communicates with the inside of the container near the bottom thereof. The liquid conduit is connectable to the filler conduit of the planter.

There may also be means for pressurizing the liquid container so the air conduit between the liquid container and the air valve contains pressurized air and liquid flows through the liquid conduit and filler conduit to the reservoir of the planter.

The means for pressurizing may comprise an air pump connected to the liquid container for pressurizing an air space above the liquid in the liquid container so the air is released when liquid rises in the float chamber and the air valve opens to stop the flow of liquid to the reservoir.

BRIEF DESCRIPTION OF THE DRAWINGS

The drawing is a diagrammatic side view, partly in section, of an apparatus for irrigating plants according to an embodiment of the invention.

DESCRIPTION OF THE PREFERRED EMBODIMENT

The drawing illustrates an apparatus 1 for irrigating plants. The apparatus is particularly suited for hydroponic irrigation and for irrigation of hanging plants.

The apparatus 1 includes a planter 2, the top portion of which comprises a container 3 for a growing medium 4. The planter, and consequently the container, are cylindrical in shape in this preferred embodiment and have an open top 6. The bottom of the container 3 is formed by a false bottom 8 held in place by a pair of spaced apart circumferential ridges 10 and 12 extending about the inside of planter 2. The growing medium 4 may comprise soil, sand, gravel or another material suitably used for growing plants.

The planter 2 also includes a liquid reservoir 14 below the container. The reservoir comprises the lower portion of the planter separated from the container by the false bottom 8. A plurality of openings 16 extend through the false bottom between the reservoir 14 and the container 3. These openings permit a flow of liquid from the reservoir to the container.

A filler conduit 18 comprises a relatively rigid tube extending from near top 6 of the planter and which communicates with the reservoir through the false bottom 8. The filler conduit is used to fill the reservoir 14 with a liquid such as water or a nutrient solution.

The planter 2 also has a float chamber 20 located outside the container 3 near the top 6. A float chamber conduit 21 comprises a tube having a top end 22 which communicates with the bottom 24 of the float chamber and a bottom end 26 which communicates with reservoir 14. The float chamber conduit permits liquid to flow from the reservoir into the float chamber.

A normally closed air valve 28, of the type used in automobile tires, is connected to the top 30 of the float chamber. The air valve has a stem 32 which extends downwardly into the float chamber. A float 34 is connected to valve stem 32. The float in the preferred embodiment comprises a relatively light hollow plastic sphere. The float pushes upwardly on the valve stem to open air valve 28 when liquid from reservoir 14 rises in the float chamber. An air conduit 36 is normally connected to the valve 28. Pressurized air from the air conduit is released through the valve when the valve is opened by upward movement of float 34.

The air conduit 36 comprises a flexible tube connected to a nipple 38 on the top 40 of a closed liquid container 42. In the preferred embodiment the liquid container comprises a flexible plastic bottle. The nipple 38 provides means for connecting the air conduit 36 to the container so an end 44 of air conduit 36 opposite air valve 28 communicates with the inside 46 of the liquid container near the top 40 thereof.

The apparatus 1 also includes a liquid conduit 48 comprising a flexible tube having a top end 50 which connects to the filler conduit 18 of the planter. The liquid conduit 48 has a bottom end 52 which extends to near the bottom 54 of liquid container 42.

The apparatus also includes means for pressurizing the liquid container so the air conduit 36 and air above surface 56 of liquid in the container becomes pressurized. The pressurization of this air forces liquid upwardly through liquid conduit 48, down through filler conduit 18 into reservoir 14. In the preferred embodiment, the means for pressurizing comprises an air pump 58. The air pump may be of the type used for supplying air to aquariums. An air pump conduit 60 connects the air pump to nipple 68 of container 42.

The air pump has an electric supply cord 64 connected to an automatic timer 62 which governs the period during which the pump operates. The cord 66 of the timer is connected to a conventional electric supply outlet.

During the period of time when the liquid containers is pressurized with air from the air pump, liquid is forced from the liquid container which is normally located below the planter 2. The liquid passes up liquid conduit 48 and enters the reservoir 14. The period of air pressurization is set by timer 62 so there is sufficient time to pump liquid from the container into the reservoir to fill the reservoir and then flow into the container 3 through openings 16. When the level of liquid in the container has risen to the level of float 34, the liquid also rises in float chamber 20 to this level. The liquid pushes upwardly on the float 34 to open the air valve 28. This releases air from the air valve which escapes at the top of the float chamber. The release of air depressurizes liquid container 42 and stops the flow of liquid upwardly through liquid conduit 48. The liquid level then drops until the level in the float chamber is reduced and the air valve closes again. This stops the level of liquid from pouring over the top of container 3.

Once the period of time set by timer 62 has ended, pressurized air is no longer supplied to the inside 46 of container 42 through conduit 60 and nipple 68. Liquid conduit 48 then acts as a siphon, permitting a reverse flow of liquid from the reservoir 14 back to the liquid container 42. Filler conduit 18 has a bottom end 19 which is located a distance above bottom 72 of reservoir 14. This means that a volume of liquid below the bottom end 19 of filler conduit 18 remains after the irrigation cycle is completed. Water vapour from the liquid in the reservoir keeps the growing medium floor moist to some extent in between waterings.

It may be seen that the apparatus is particularly suitable for hanging plants because the liquid container 42 as well as the air pump 48 can be located near floor level while connected to the planter by conduits 36 and 48 only.

In an alternative embodiment, the air pump 58 and timer 62 may be deleted. Nipple 68 on liquid container 42 is sealed with a plug 74. The apparatus can then be operated manually be squeezing the flexible walls of liquid container 42. This pressurizes the air above surface 56 of the liquid and forces the liquid up the liquid conduit. The liquid container is squeezed until the air is released by air valve 28. When the container is released, excess liquid flows back into the container through liquid conduit 48.

In a further alternative embodiment, float chamber 20 may be positioned inside the wall of container 3 instead of outside as shown in the drawing.

What is claimed is:

1. An apparatus for irrigating plants, the apparatus comprising a planter having a container for a growing medium; a liquid reservoir below the container; openings between the reservoir and the container, permitting a flow of liquid from the reservoir to the container; a filler conduit communicating with the reservoir; a float chamber near the top of the container; a float chamber conduit extending from the reservoir to the float chamber; a float in the float chamber; a normally closed air valve operatively connected to the float so the float opens the valve when liquid from the reservoir rises in the float chamber;

an air conduit connected to the valve so pressurized air from the air conduit is discharged when the valve opens; and a closed liquid container normally positioned below the planter, the liquid container having a top, a bottom, and means for connecting the air conduit to the container so an end of the air conduit opposite the air valve communicates with the inside of the liquid container near the top thereof and a liquid conduit communicates with the inside of the container near the bottom thereof, the liquid conduit being connectable to the filler conduit of the planter.

2. An apparatus as claimed in claim 1, further comprising means for pressurizing the liquid container so the air conduit between the liquid container and the air valve contains pressurized air and liquid flows through the liquid conduit and the filler conduit to the reservoir of the planter.

3. An apparatus as claimed in claim 2, wherein the means for pressurizing comprises flexible walls of the liquid container.

4. An apparatus as claimed in claim 2, wherein the means for pressurizing comprises an air pump connected to the liquid container for pressurizing an air space above the liquid in the liquid container so the air is released when liquid rises in the float chamber and the air valve opens to stop the flow of liquid to the reservoir.

5. An apparatus as claimed in claim 4, further comprising timing means for initiating a flow of air from the air pump to the liquid container and for terminating the flow of air from the air pump to the liquid container after a period of time.

6. An apparatus for irrigating plants, the apparatus comprising a planter having a container for a growing medium; liquid receiving means below the growing medium; means permitting a flow of liquid from the liquid receiving means to the growing medium; a filler conduit communicating with liquid receiving means; a float chamber near the top of the container; means permitting a flow of liquid from the liquid receiving means to the float chamber; a float in the float chamber; a normally closed air valve operatively connected to the float so the float opens the valve when liquid from the liquid receiving means rises in the float chamber;

an air conduit connected to the valve so pressurized air from the air conduit is discharged when the valve opens; and a closed liquid container normally positioned below the planter, the liquid container having a top, a bottom, and means for connecting the air conduit to the container so an end of the air conduit opposite the air valve communicates with the inside of the liquid container near the top thereof and a liquid conduit communicates with the inside of the container near the bottom thereof, the liquid conduit being connectable to the filler conduit of the planter.

7. An apparatus as claimed in claim 6, further comprising means for pressurizing the liquid container so the air conduit between the liquid container and the air valve contains pressurized air and liquid flows through the liquid conduit and the filler conduit to the liquid receiving means of the planter.

8. An apparatus as claimed in claim 7, wherein the means for pressurizing comprises flexible walls of the liquid container.

9. An apparatus as claimed in claim 7, wherein the means for pressurizing comprises an air pump connected to the liquid container for pressurizing an air space above the liquid in the liquid container so the air is released when liquid rises in the float chamber and the air valve opens to stop the flow of liquid to the liquid receiving means.

10. An apparatus as claimed in claim 9, further comprising timing means for initiating a flow of air from the air pump to the liquid container and for terminating the flow of air from the air pump to the liquid container after a period of time.

11. An apparatus as claimed in claim 6, wherein the liquid receiving means has a bottom and the filler conduit has an end in the liquid receiving means spaced above the bottom of the liquid receiving means.

* * * * *